United States Patent [19]

Gronlykke

[11] 4,364,518
[45] Dec. 21, 1982

[54] SELF-PROPELLED IRRIGATOR

[76] Inventor: Sven Gronlykke, Logismose Gods, 5683 Harby, Funen, Denmark

[21] Appl. No.: 190,325

[22] PCT Filed: Mar. 21, 1979

[86] PCT No.: PCT/DK79/00010
§ 371 Date: Nov. 22, 1979
§ 102(e) Date: Sep. 20, 1979

[87] PCT Pub. No.: WO79/00810
PCT Pub. Date: Oct. 18, 1979

[30] Foreign Application Priority Data

Mar. 22, 1978 [DK] Denmark .............................. 1321/78
Jun. 6, 1978 [DK] Denmark .............................. 2509/78

[51] Int. Cl.³ .............................................. B05B 3/18
[52] U.S. Cl. ...................................... 239/191; 239/199
[58] Field of Search ............... 239/188, 189, 191, 192, 239/195–199

[56] References Cited

U.S. PATENT DOCUMENTS

| | | | |
|---|---|---|---|
| 1,456,464 | 5/1923 | Rolland | 239/191 |
| 1,507,506 | 9/1924 | Murphy | 239/189 |
| 1,658,202 | 2/1928 | Jones | 239/189 X |

FOREIGN PATENT DOCUMENTS

| | | | |
|---|---|---|---|
| 132734 | 2/1976 | Denmark | 239/195 |
| 215616 | 11/1908 | Fed. Rep. of Germany | 239/189 |
| 294358 | 8/1914 | Fed. Rep. of Germany | 239/189 |

*Primary Examiner*—Andres Kashnikow
*Attorney, Agent, or Firm*—Cushman, Darby & Cushman

[57] ABSTRACT

A self-propelled irrigator includes a plurality of containers separated by partitions and arranged in a circular pattern about a horizontal axle; a ground-engaging wheel fixed to the axle; a reel rotatable about the axle, a hose wound on the reel, the hose having a free end adapted to be connected to a stationary water supply source and having a second end; a water outlet in communication with the second end of the hose, the water outlet being carried by the irrigator above the containers for filling each container with water when it is in an uppermost position, the containers being constructed and arranged to release water during movement of the filled containers past their lowermost position and the hose being wound on the reel in such a manner that upon movement of the irrigator resulting from filling of the uppermost containers the reel rotates about the axle in a direction to unwind the hose from the reel.

8 Claims, 7 Drawing Figures

SELF-PROPELLED IRRIGATOR

TECHNICAL FIELD

The present invention relates to a self-propelled irrigator for irrigation of row crops, lawns, and the like areas, and comprising a hose wound up on a reel, water from a stationary tap flowing through said hose to a nozzle unit such as a sprinkler and to an outlet through a driving wheel comprising containers along its periphery, said containers being supplied with water when they are in an uppermost position in front of the vertical, diametral plane of the wheel and releasing water during the movement past their lowest position.

BACKGROUND ART

German patent specification No. 215,616 discloses an irrigator comprising a water distributing pipe situated between two driving wheels. Along the periphery these driving wheels comprise tiltable cups, which are supplied with water when they are in their uppermost position and emptied when they hit a stop in their lowest position and thereby tilt. These known cups are therefore only filled with water when they are in a particular uppermost position, which, especially when the apparatus is being started, involves an insufficient or no propellant moment. Furthermore, the mechanical tilting of the cups in their lowest position involves a sudden emptying which does not provide a necessary braking effect when the apparatus moves downhill. Consequently, the apparatus moves forwards at an uncontrollable speed, to which must be added that these tiltable cups are expensive to manufacture and to keep in repair.

DISCLOSURE OF INVENTION

The object of the invention is to provide an inexpensive apparatus of the above type, which ensures a more regular and a more powerful propulsion compared to these known apparatuses in such a manner that the apparatus according to the invention—in spite of the considerable and varying load from a hose wound up on the reel—can move forwards at a uniform speed even on a slightly hilly ground, and which furthermore permit a uniform irrigation with controllable amounts of water.

The self-propelled irrigator according to the invention is characterised in that the containers are chambers separated by partitions curved backwards in the direction of rotation relative to the wheel radii, said partitions connecting two side walls perpendicular to the wheel axis, and whereby the outer portions of said partitions form guiding plates inclining towards the wheel axis in such a manner that they can guide the trickling or overflowing water into a narrow slot at the trailing edge of the partition ahead of the direction of rotation when the chambers are in their uppermost positions in front of the vertical, diametral plane of the wheel when seen in the driving direction, and furthermore in such a manner that the inlet slots turning downwards on the rear half of the wheel form flow restrictors for the outflowing water.

The driving wheel can be inexpensively manufactured, e.g. of plastics, and requires no maintenance. In addition, a uniform irrigation of the area is obtained since the apparatus moves forwards by a considerably power and at a uniform speed, also when moving on hilly grounds. The constant, controllable jet of liquid through the outlet fills the chambers on the front of the wheel, since the water—when the uppermost chamber at the start is filled—flows into the preceding chamber and—when this chamber has been filled—forwards to the next chamber situated therebelow etc., until the torque is sufficient for driving the wheel forwards. Subsequently, the chambers are slowly emptied at the back of the wheel, which provides a necessary braking effect and consequently a uniform, stepwise operation. The wheel is influenced by imbalance implying that the wheel moves forwards at regular intervals each time a plurality of chambers have been filled. Then the water flows out, and the wheel stops until a corresponding plurality of new chambers has been filled. The slow emptying of the chambers implies that the tendency of the wheel to roll faster when driving downhill is counteracted because a higher number of not yet emptied chambers are carried to the rear half of the wheel. By regulating the water flow through the outlet to the chambers, the driving speed of the apparatus and consequently the amount of water supplied to the ground can be regulated.

In order to guide the water safely downwards to the preceding chamber and in order to avoid waste of water, it is according to the invention preferred that the side walls of the driving wheel extend radially past the free trailing edges of the partitions.

For smaller lawns it is completely sufficient that the apparatus comprises only one driving wheel at one end of the wheel axis and a general supporting wheel of the same diameter at the opposite end of the axis. However, for irrigation of row crops and larger grass areas in parks and sports grounds, a driving wheel can be provided at both ends of the wheel axis. The wheels may furthermore be displaceably arranged on the wheel axis whereby their mutual distance can be changed.

In an embodiment of the irrigator according to the invention a predetermined wheel diameter provides an increase of the tractive capacity for propelling the apparatus, and this embodiment is according to the invention characterised in that the driving wheel forms part of the reel, on which the hose is wound, and the width of which corresponds substantially to the width of the reel. Since the driving wheel is built into the reel, it may have a considerable width whereby the chambers may contain a correspondingly high amount of water providing a heavy torque.

In a simple and inexpensive embodiment of the apparatus according to the invention, the reel itself forms the driving wheel and comprises closed end bottoms provided with edge portions projecting radially outwards from the reel cylinder and forming road wheels, and whereby at least one of said edge portions together with an additional radial flange define a groove located under the water outlet, said groove communicating freely with the chambers of the driving wheel, the partitions of said chambers forming paddle blades extending from end bottom to end bottom within the reel. Reel bearings and particular road wheels are not necessary in such a construction, and since the diameter of the reel need not be smaller than the diameter of the road wheels it is possible to wind up a relatively long hose on the reel, said reel thereby driving directly on the hose or on the edge portions of the end bottoms projecting outwards.

When the hose reel itself forms the driving wheel, it is according to the invention preferred that the portion of the reel on which the hose is wound up is surrounded by a cylindrical jacket protecting the chambers between the paddle blades against fouling.

This cylindrical jacket may according to the invention be radially spaced from the ends of the paddle blades forming the partitions of the chambers. As a result, the water can flow quickly through the chambers as well as said chambers can be easily cleaned by rinsing with water.

BRIEF DESCRIPTION OF DRAWINGS

The invention will be described below with reference to the accompanying drawings, in which.

BEST MODE FOR CARRYING OUT THE INVENTION

Figure 1:
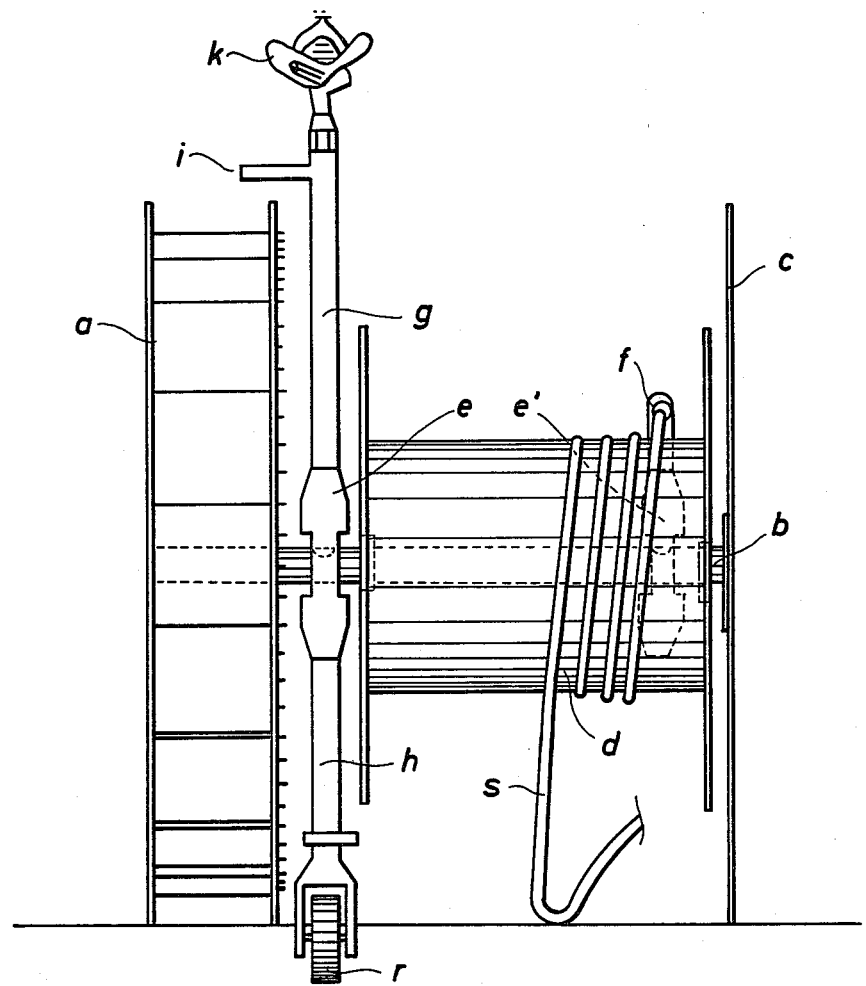
FIG. 1 is a front view of an embodiment of the irrigator according to the invention.
Figure 2:
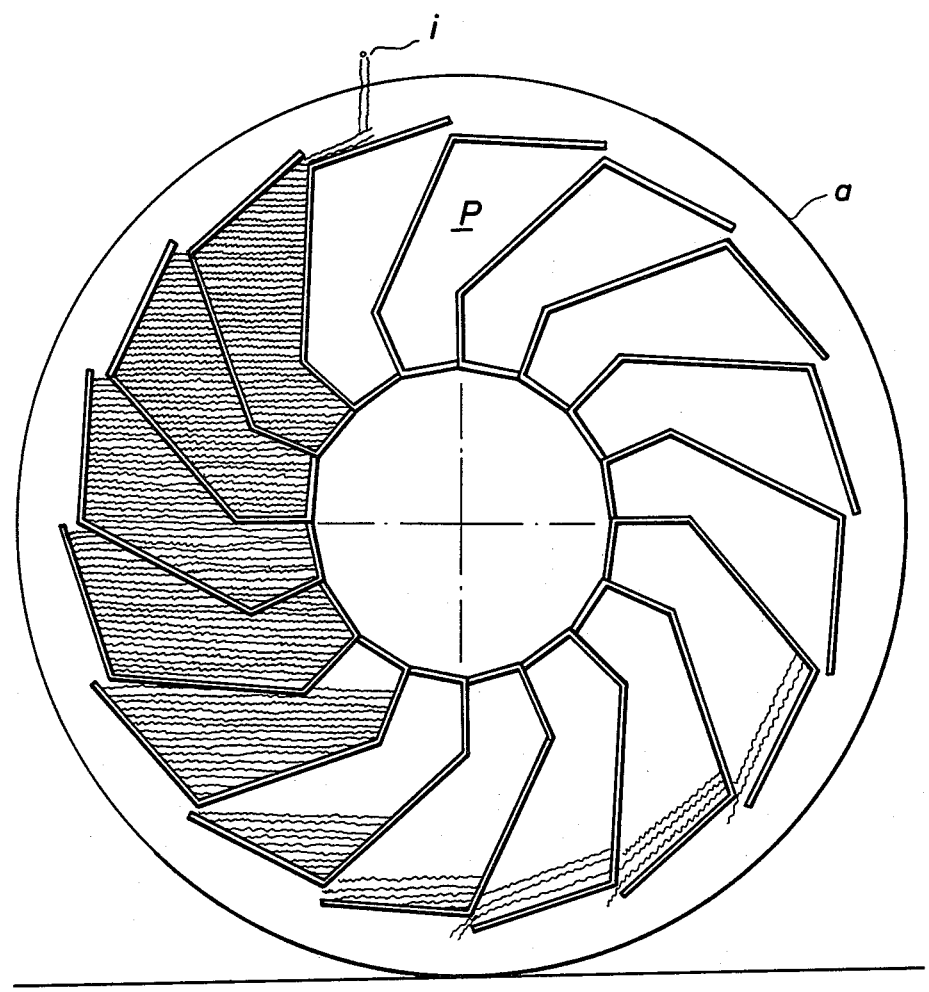
FIG. 2 is a side view of the driving wheel of the apparatus, whereby a side plate is removed.

The irrigator illustrated in FIG. 1 comprises a driving wheel a formed by two side plates. A plurality of chambers p regularly distributed about the axis, cf. FIG. 2, are situated between these two side plates. Each of these chambers is closed towards the centre of the wheel by an end wall extending into a partition curved radially backwards in the direction of rotation. This partition ends up in a wall portion including backwards, an inlet slot for water being shaped at the free trailing edge of said wall portion. The substantially radial walls may also be formed as continuous paddle blades curved backwards.

The driving wheel a is unpivotably mounted at the end of a pipe b forming a wheel axle, at the opposite end of which a fixedly mounted supporting wheel c is provided, the diameter of which corresponds to the diameter of the driving wheel a. A reel d is rotatably mounted on the pipe b, and a water hose s is wound up on the reel. This hose is connected to a tap at the end of the area to be irrigated. Such taps may for instance be situated on a pipe at regular intervals of about 20 m, said pipe being located at the end of the lawn or field with crops to be irrigated. The end of the hose wound up on the reel is connected to a branch f turning forwards in the direction of travel in such a manner that the reel unwinds the hose from under the apparatus, so that said hose does not impede forward movement. The branch f is mounted on a swivel e' located above an aperture in the pipe b, thus permitting inflow of water from the hose to the interior of the pipe. The pipe b also comprises a swivel e opposite a second aperture in the pipe wall, and through this aperture water is carried through a pipe g to a sprinkler k irrigating the area. The pipe g furthermore comprises a branch pipe having an outlet, through which water is made to flow downwards into the front and uppermost chambers p. First this uppermost chamber is filled, whereafter the water flows on the outside of the chamber wall downwards into the preceding chamber etc. until the driving wheel a has such an imbalance that it turns forwards, and the water in the lowest chamber starts to flow out, whereafter the wheel stops until the imbalance is sufficiently great to drive the wheel forwards. The pipe i may optionally be provided with a valve or a cock regulating the outflow of water to the chambers and consequently the speed of the apparatus across the ground. The swivel e comprising the outlet i and the sprinkler k is at its lowest end provided with a rod h. A moving wheel r is mounted on this rod in such a manner that it is always ahead of the apparatus and maintains the pipe g in a vertical position.

The rod h and the wheel r may advantageously be replaced by a U-shaped yoke trailing backwards and simultaneously serving as a handle. During the forward movement, this yoke slides on the rod, which provides a minimum friction and prevents the apparatus from being stopped by holes in the ground.

This embodiment as well as other embodiments of the apparatus according to the invention have the advantage that the water supply to the sprinkler and to the propellant means can easily be regulated independent of each other. This means that the apparatus can also be used as a stationary irrigator. Furthermore, the irrigation is independent of the water pressure since a rise in the pressure involving a faster propellant speed implies that a correspondingly higher amount of water is irrigated from the sprinkler.

Figure 3:
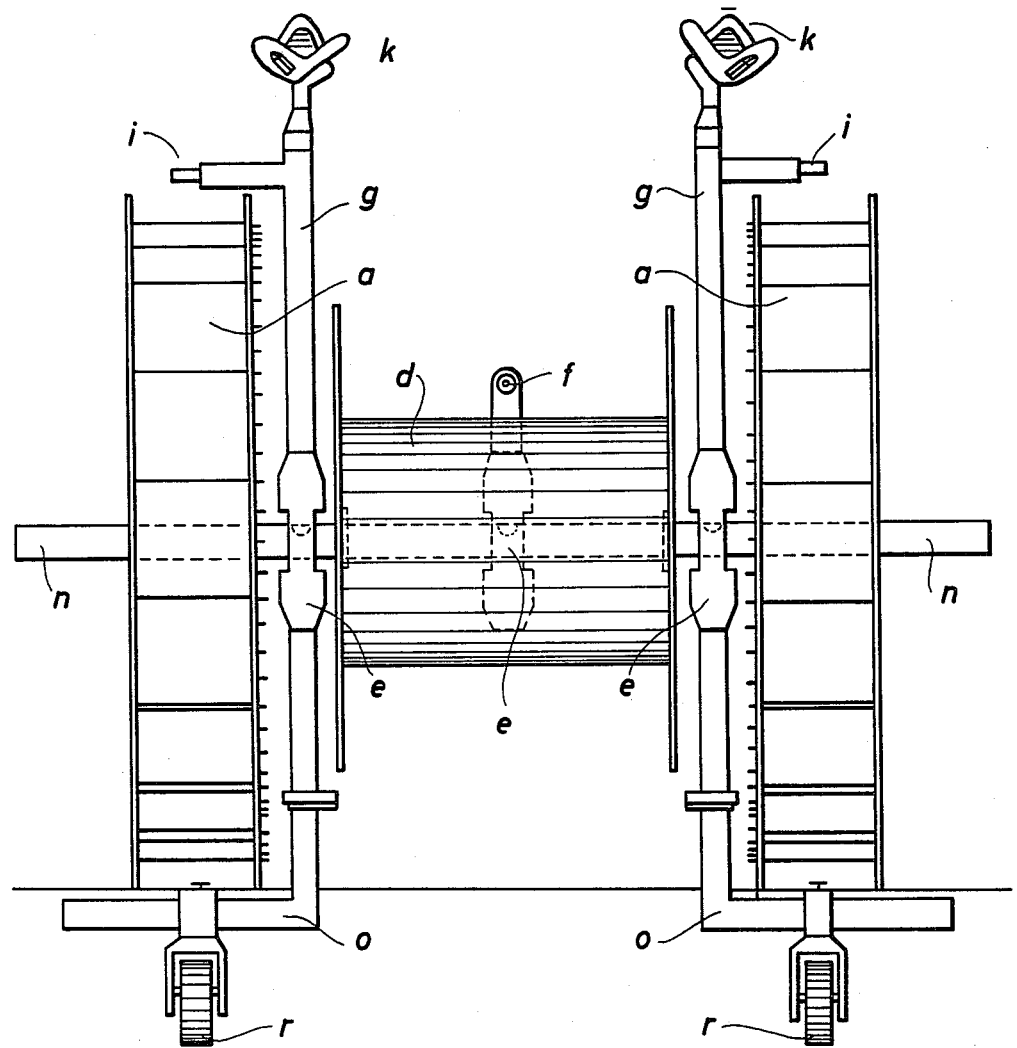
FIG. 3 is a front view of a second embodiment of the apparatus according to the invention.

The embodiment of the apparatus illustrated in FIG. 3 is particularly intended for large parks, sports grounds, and for irrigation of row crops in market gardens. In this embodiment, driving wheels a and sprinklers k are provided on both sides of the apparatus. Furthermore, the driving wheels are adjustably mounted in axial direction on axial extensions n, which also applies to the front wheels r displaceably mounted on axles o. The pipe comprising the outlet i for supply of water to the chambers in the driving wheels may be correspondingly extended.

Figure 7:
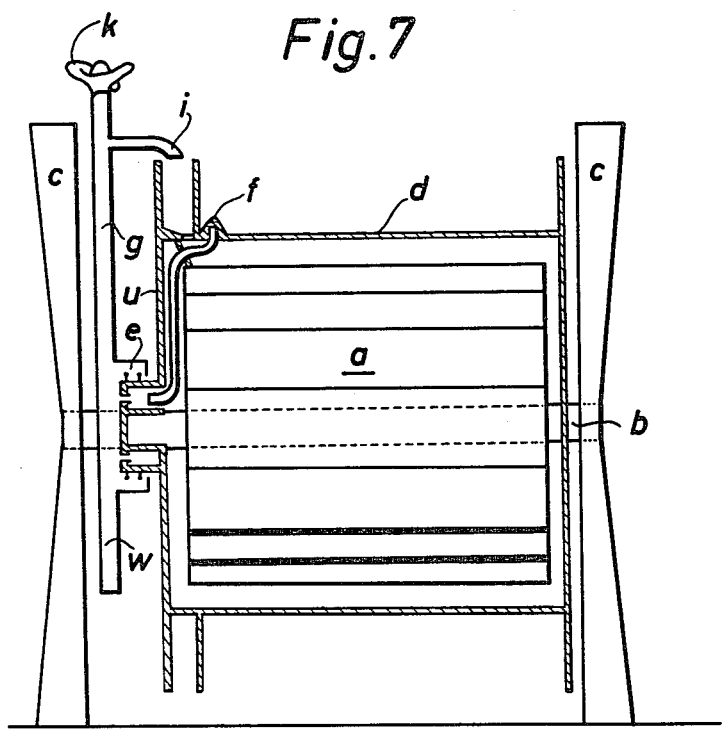
FIG. 7 is an axial, sectional view through a fifth embodiment of the irrigator according to the invention.

In the embodiment illustrated in FIG. 7 the reel d is rotatably mounted on an axle b unpivotably connected to the road wheels c and the driving wheel a, the diameter of which is slightly smaller than the inside diameter of the reel. The width of the driving wheel a is only slightly smaller than the inside width of the reel, and the long water chambers provide a considerable torque on the road wheels when filled with water. The water supplied through the hose to the connecting branch f flows through a conduit u via a swivel e and a vertical conduit g to a sprinkler k and an outlet i. Subsequently, the water flows down into a groove outside the reel d and through apertures in the bottom of the groove down into the chambers of the driving wheel.

Figure 4:
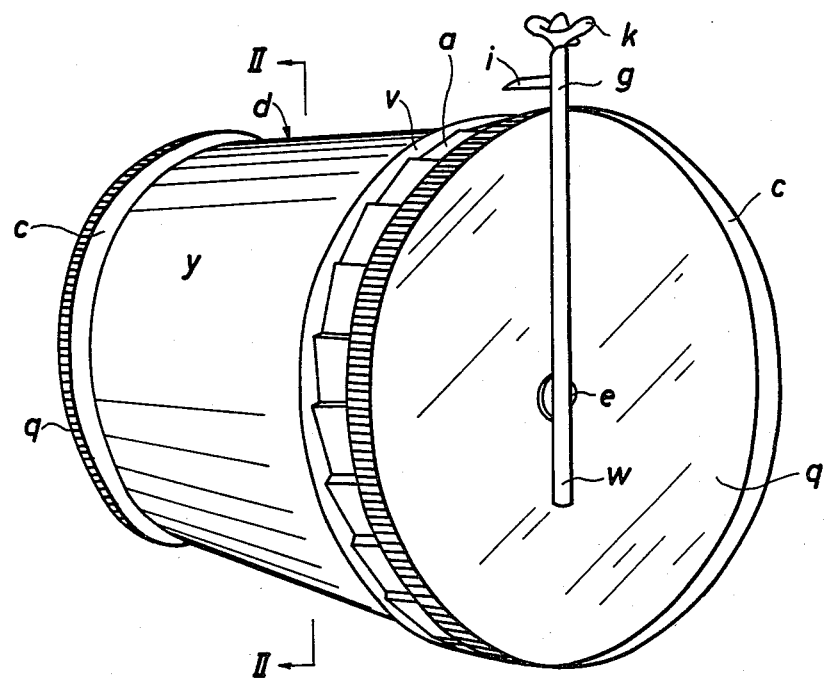
FIG. 4 is a perspective view of a third embodiment of the irrigator according to the invention.
Figure 5:
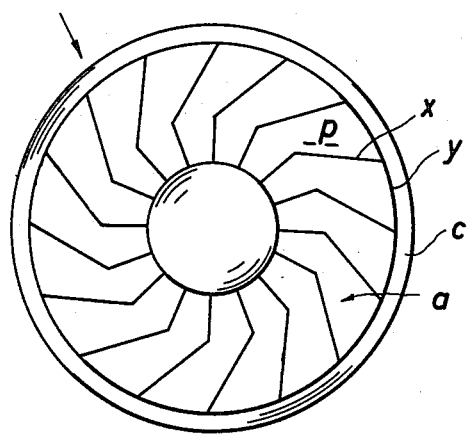
FIG. 5 is a sectional view through the reel taken along the arrows II—II of FIG. 4.
Figure 6:
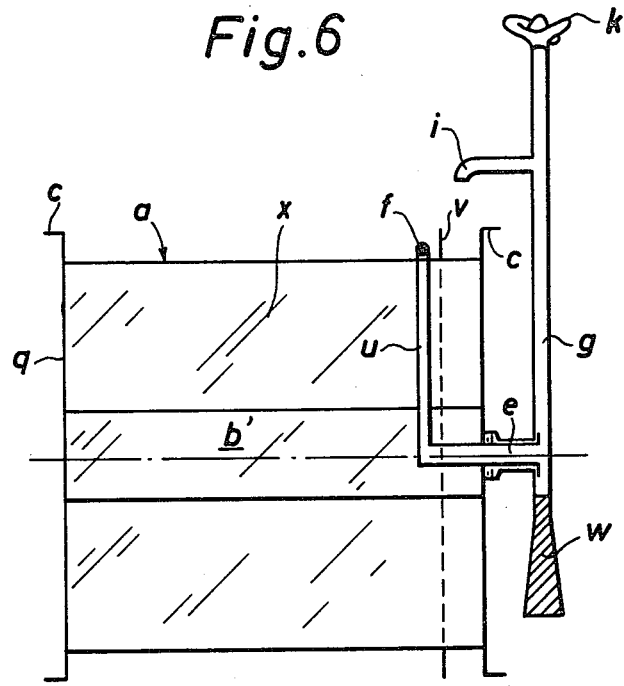
FIG. 6 is an axial, sectional view through a fourth embodiment of the irrigator, whereby the reel is not provided with a cylindrical jacket.

In the embodiment illustrated in FIGS. 4 to 6, the water also flows from the connecting branch f, cf. FIG. 6, through the conduit u via the swivel e and the conduit g to the sprinkler k and the outlet i. Subsequently, the water flows down into the groove defined by an edge portion c projecting outwards from the closed end bottom of the reel and a radial edge flange v situated inside said end bottom. The groove is open towards the chambers p of the driving wheel a, said chambers being defined by the end bottoms of the reel and substantially radial, however curved, paddle blades x as well as an inner cylindrical pipe b'. Here the reel is utilized as driving wheels in its entire width out to the edge portions c forming road wheels. These paddle blades may, of course, also be assembled in another manner at their inner edges, a transverse pipe or an axle at the centre of the reel not necessarily being provided.

In the embodiment illustrated in FIG. 6 the chambers p are open outwards along their entire length, and the paddle blades x are secured to the end bottoms, the edge portions c of which projecting outwards forming road wheels. The end bottom illustrated left in FIG. 6 cooperate with the edge flange v in preventing the hose from rolling out over the reel ends. If desired, an edge flange v may also be provided at the end bottom illustrated left in the Figure, whereby a groove is formed, which is supplied with water from an additional outlet i.

In the embodiment illustrated in FIGS. 4 and 5, the portion of the reel on which the hose is wound up is surrounded by a cylindrical jacket y protecting the chambers p against fouling.

I claim:

1. A self-propelled irrigator for the irrigation of crop rows, lawns and like areas, comprising a vertical rotational ring of containers comprising chambers separated by partitions, said containers being adapted to be supplied with water from a water-outlet of the irrigator provided above the containers for filling each container when it is in an uppermost position, the water being released during the movement of the filled containers past their lowest position, the ring of containers being provided on a ground wheel of a self-driving reel on which is wound a hose for supplying the water outlet with water from a stationary tap, said reel unwinding the hose when the irrigator moves forward, said wheel forming part of the reel and having a width corresponding substantially to the width of the reel and the reel comprising closed end bottoms provided with edge portions projecting radially outwards from a reel cylinder and forming wheels, at least one of said edge portions together with an additional radial flange defining a groove located under the water outlet, said groove communicating freely with the chambers of the wheel, the partitions of said chambers forming paddle blades extending from end bottom to end bottom in the reel.

2. An irrigator as claimed in claim 1, wherein the side walls of the wheel extend radially past the free trailing edges of the partitions.

3. An irrigator as claimed in claim 1, wherein the paddle blades are surrounded by a cylindrical jacket forming the hose-receiving surface of the reel adjacent the water-receiving groove.

4. An irrigator as claimed in claim 3, wherein the cylindrical jacket is radially spaced from the ends of the paddle blades.

5. A self-propelled irrigator comprising a plurality of containers separated by partitions and arranged in a circular pattern about a horizontal axle; a ground-engaging wheel fixed to the axle; a reel rotatable about said axle, a hose wound on the reel, the hose having a free end adapted to be connected to a stationary water supply source and having an opposite end; a water outlet in communication with said opposite end of said hose, said water outlet being carried by the irrigator above the containers for filling each container with water when it is in an uppermost position, the containers being constructed and arranged to release water during movement of the filled containers past their lowermost position and the hose being wound on the reel in such a manner that upon movement of the irrigator resulting from filling of the uppermost containers the reel rotates about the axle in a direction to unwind the hose from the reel.

6. An irrigator as in claim 5 wherein said wheel forms part of the reel and has a width corresponding substantially to the width of the reel, the reel comprising closed end bottoms provided with edge portions projecting radially outwards from a reel cylinder and forming wheels, at least one of said edge portions together with an additional radial flange defining a groove located under the water outlet, said groove communicating freely with the chambers of the wheel, the partitions of said chambers forming paddle blades extending from end bottom to end bottom in the reel.

7. An irrigator as in claim 6 wherein the paddle blades are surrounded by a cylindrical jacket forming the hose-receiving surface of the reel adjacent the water-receiving groove.

8. An irrigator as in claim 7 wherein the cylindrical jacket is radially spaced from the ends of the paddle blades.

* * * * *